April 21, 1936.  C. E. SWENSON  2,037,947
UNIVERSAL JOINT
Filed Jan. 22, 1934
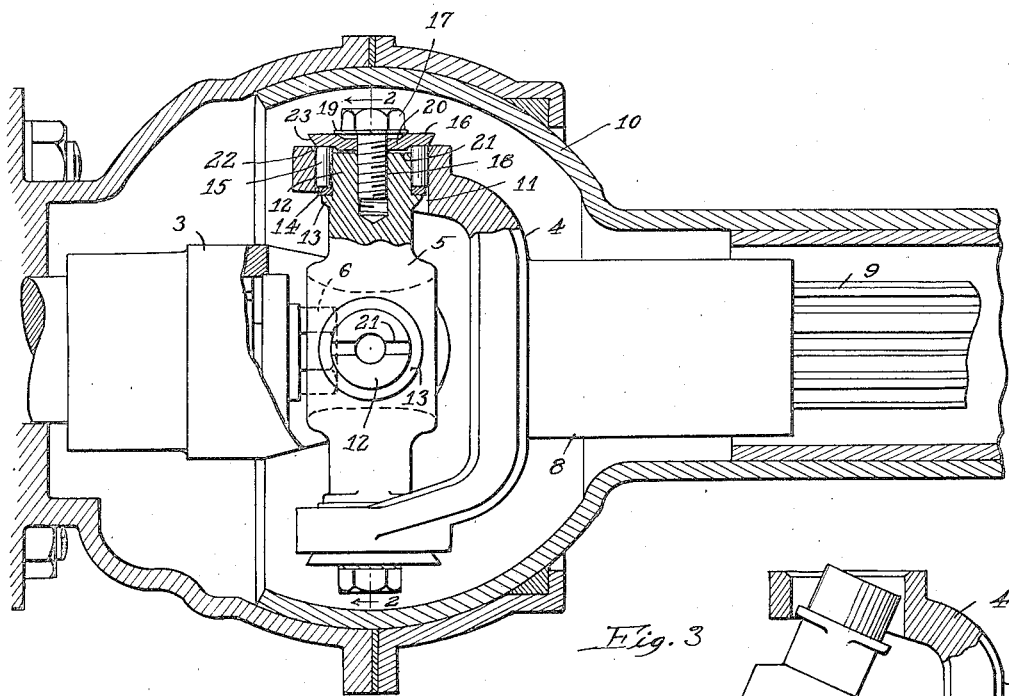
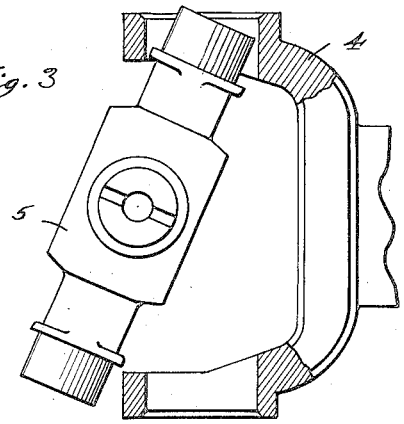
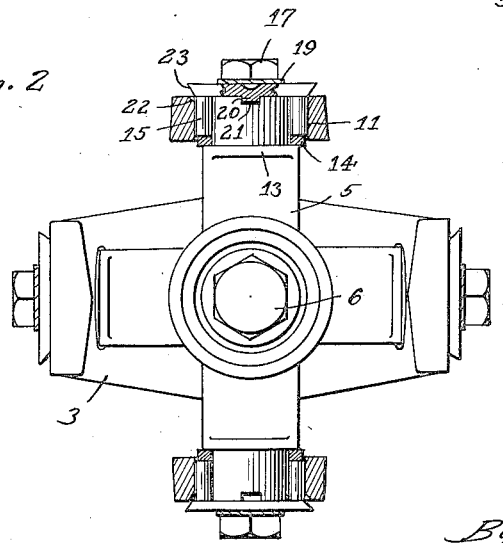
Inventor:
Carl E. Swenson
By
Wilson, Dowell, McCanna & Hintereon
Attys.

Patented Apr. 21, 1936

2,037,947

UNITED STATES PATENT OFFICE 2,037,947

UNIVERSAL JOINT

Carl E. Swenson, Rockford, Ill., assignor, by mesne assignments, to Borg-Warner Corporation, Chicago, Ill., a corporation of Illinois Application January 22, 1934, Serial No. 707,633

4 Claims. (Cl. 64—17)

This invention relates to universal joints of the trunnion type, and more particularly one embodying roller bearings and adapted for use on motor vehicles.

The principal object of my invention is to provide a joint which while it has roller bearings, is nevertheless capable of production at very low cost so as to be available for use on moderate and low priced cars.

In this joint the spider is made so that the trunnions can be entered freely into the bearing holes in the yokes, after which a ring is slipped over each trunnion and rollers are assembled in the bearing hole, and a retainer disk is bolted onto the end of the trunnion, completing the assembly. The rollers are held against endwise displacement between the ring and disk with freedom to roll on the trunnion and in the bearing hole. The disk has enough clearance left between it and the yoke to allow for slight end play of the trunnions of the spider with respect to the yoke members, the play being limited by engagement of the disks with the yokes. In this way the joint compensates for slight misalignment between the shafts and is therefore especially adapted for use on cars where only one joint is employed, operating inside a spheroidal housing directly behind the transmission, which may not be accurately centered with the joint.

The invention is illustrated in the accompanying drawing, in which—

Figure 1 is a side view of a universal joint embodying my invention, a portion of one yoke being broken away to show the end of one trunnion of the spider, and one of the bearings being shown in longitudinal section;

Fig. 2 is a cross-section on the line 2—2 of Figure 1, and

Fig. 3 is a view showing how the spider is entered in the yokes.

The numerals 3 and 4 designate the two yoke members which are interconnected by a spider 5. The one yoke is fastened as indicated at 6 to the splined end of the driving shaft 7 projecting from the transmission housing, and the other yoke has an elongated hub 8 internally splined for a sliding driving connection with the driven propeller shaft 9, extending through the usual torque tube, to the rear axle housing. The joint operates inside the conventional spheroidal housing 10, mounted on the transmission housing in substantially concentric relation to shaft 7.

In accordance with my invention, radial bearing holes 11 are made accurately in coaxial alignment in the two arms of each yoke, and the trunnions 12 on the spider 5 are made small enough to permit entering the same freely, first one trunnion in one hole and then the diametrically opposite trunnion in the other hole of a given yoke member, as indicated in Fig. 3. A small annular shoulder 13 is provided at the base of each trunnion, small enough so as not to interfere with the free entry of the trunnions into the bearing holes. These shoulders serve to locate rings 14 which are slipped over the trunnions in the holes 11 to provide an annular flat surface around the base of each trunnion for engagement by the inner ends of rollers 15 assembled in the holes 11 around the trunnions 12. The rings 14 can be stamped from sheet metal and give the desired accuracy at less expense than annular shoulders could be accurately machined on the spider. Disks 16 engage the outer ends of the rollers and are fastened to the trunnions 12 by cap screws 17 threaded in axial holes 18 provided in the trunnions. Lock washers 19 are placed under the heads of the screws. When the disks are fastened in place the rollers are held against displacement and the assembly is completed. The disks 16 similarly as the rings 14 can be made from sheet metal to give the desired accuracy, such that the rollers 15 when provided of a specified length will be retained between the rings and disks without freedom to move endwise relative to the trunnions but with freedom to roll on the trunnions and in the bearing holes. In other words, the rollers will at all times move as a unit with the spider 5, instead of moving back and forth between the rings and disks, whereby to operate smoothly and quietly and with minimum wear and development of play. The disks 16 after punching will be formed in a coin press operation to provide a diametrical rib or key projection 20 on each, shorter than the diameter of the trunnion, to enter a diametrical groove 21 formed in the end of the trunnion, whereby to lock the disks against turning relative to the trunnions. Now, it is seen that the outer ends of the holes 11 are flared as at 22 and the peripheries of the disks 16 are formed, preferably in the same coin press operation referred to before, with a corresponding taper 23; this is to allow a certain amount of end play of the trunnions of the spider in the yokes to compensate for such slight misalignment as there may be between the shafts 7 and 9 by reason of the housing 10 being slightly off center. It also provides a sufficient enlargement of the outer ends of holes 11 to facilitate entering the rings 14 and rollers 15, so that such assembling may be done in an assembling machine. The yokes will have the arms thereof machined to a specified diametrical dimension measured from the outer end of one hole 11 to the outer end of the opposite hole, and the spider 5 will have the flat ends of the trunnions machined to the same diametrical dimension, whereby to allow a predetermined clearance between 22 and 23 and a corresponding amount of end play, the end play being, of course, limited by engagement of the surfaces 22 and 23.

It is believed to be apparent from the foregoing description that I have provided a universal joint requiring minimum close machining so that it can be produced at low cost. The simplicity with which the spider can be assembled in the yokes and the bearings assembled on the trunnions is another important factor in keeping down the cost. However, despite the economy practised in the design and construction of the joint, this has not been at the sacrifice of easy running or durability, which must be evident from the drawing.

I claim:

1. A universal joint comprising one-piece yokes having spaced arms and radial bearing holes provided in said arms and a spider having radial trunnions of sufficiently smaller diameter to provide roller clearance in said bearing holes around said trunnions and permit assembling the spider in the yokes prior to assembling the rollers in said holes, roller retainer means around the inner ends of said trunnions of smaller diameter than the bearing holes, rollers disposed around the trunnions filling said holes and having their inner ends engaging said retainer means, and disks of larger diameter than the bearing holes secured to the outer ends of the trunnions and serving by engagement with the outer ends of the rollers to prevent displacement thereof from the holes and by engagement with the yokes adjacent the outer ends of the holes to prevent inward displacement of the trunnions from the holes, said trunnions being movable freely endwise in said holes and said disks having their peripheral portions normally spaced a predetermined distance to permit a corresponding amount of endwise movement.

2. A pivotal joint comprising two members adapted for pivotal connection, the one member having spaced arms and radial bearing holes provided in said arms, and the other member having radial trunnions of sufficiently smaller diameter to provide roller clearance in said bearing holes around said trunnions and permit assembling the trunnion member in the other member prior to assembling the rollers in said holes, roller retainer means around the inner ends of said trunnions of smaller diameter than the bearing holes, rollers disposed around the trunnions filling said holes and having their inner ends engaging said retainer means, and disks of larger diameter than the bearing holes secured to the outer ends of the trunnions and serving by engagement with the outer ends of the rollers to prevent displacement thereof from the holes and by engagement with the other member adjacent the outer ends of the holes to prevent inward displacement of the trunnions from the holes, said trunnions being movable freely endwise in said holes and said disks having their peripheral portions normally spaced a predetermined distance from the other member to permit a corresponding amount of endwise movement.

3. A universal joint as set forth in claim 1 wherein the outer ends of the bearing holes are flared to facilitate entry of the rollers therein around the trunnions and also provide annular seats on said yokes, and wherein the periphery of each disk is tapered to conform to its associated seat.

4. A universal joint as set forth in claim 1 wherein each trunnion has a radial screw threaded hole substantially centrally in the outer end thereof, and wherein the disks are secured to the outer ends of the trunnions each by a single screw entered through a hole in the center of each disk and threaded in the hole in the trunnion, the construction further including an interfitting recess and projection on each disk and associated trunnion for holding the disk against turning relative to the trunnion.

CARL E. SWENSON.